United States Patent [19]

Crisci et al.

[11] 4,331,857
[45] May 25, 1982

[54] ALLOY-CORED TITANIUM WELDING WIRE

[75] Inventors: Joseph R. Crisci, Crofton; Robert De Nale, Annapolis; Gene L. Franke, Severna Park, all of Md.

[73] Assignee: The United States of America as represented by the Secretary of the Navy, Washington, D.C.

[21] Appl. No.: 117,141

[22] Filed: Jan. 30, 1980

[51] Int. Cl.³ .............................................. B23K 35/32
[52] U.S. Cl. ........................... 219/137 WM; 219/72; 219/145.22; 219/146.22; 219/146.32
[58] Field of Search ..................... 219/145.22, 146.22, 219/146.32, 146.31, 118, 137 WM; 75/175.5

[56] References Cited

U.S. PATENT DOCUMENTS

| | | | |
|---|---|---|---|
| 2,541,764 | 2/1951 | Herres | 219/118 X |
| 2,576,793 | 11/1951 | Jordan | 219/118 |
| 2,819,158 | 1/1958 | Johnston | 219/118 X |
| 3,118,053 | 1/1964 | Arikawa | 219/145.22 |
| 3,254,149 | 5/1966 | Cooper | 219/146.22 X |
| 3,309,496 | 3/1967 | Rosenberg | 219/118 |
| 3,834,002 | 9/1974 | Sissons | 219/146.22 X |
| 4,134,758 | 1/1979 | Nagai | 75/175.5 |

FOREIGN PATENT DOCUMENTS

| | | | |
|---|---|---|---|
| 2457199 | 7/1975 | Fed. Rep. of Germany | 219/146.31 |
| 513045 | 12/1937 | United Kingdom | 219/146.31 |

OTHER PUBLICATIONS

Metal Progress Data Sheet, Properties, Specification and Applications for Wrought Tiatanium Alloys, Mar. 1969, 4 pages.

Primary Examiner—Richard R. Kucia

[57] ABSTRACT

A welding wire comprising a hollow tubular portion of titanium metal and a core portion filling the tubular portion. The core portion is formed of compacted alloying powders selected from the group aluminum, molybdenum, niobium, tantalum and vanadium. The core portion may also include powdered titanium.

9 Claims, 2 Drawing Figures

ALLOY-CORED TITANIUM WELDING WIRE

The invention described herein may be manufactured and used by or for the Government of the United States of America for any governmental purposes without the payment of any royalties thereon or therefor.

BACKGROUND OF THE INVENTION

This invention relates to consumable welding wires and more particularly to a composite welding wire having an alloy core.

With the increasing utilization of a wide variety of metals and numerous alloys thereof, there has been a corresponding increase in the demand for welding wires which are suitably "matched" with the materials to be welded. Thus, a single welding wire having a predetermined composition cannot generally provide a satisfactory weld for all of the various alloys of the base metal. However, it is often not only difficult and expensive to manufacture a number of alloy welding wires which are particularly "matched" with the alloys of the base metal, but long manufacturing or lead times are also required.

To overcome these drawbacks, composite or cored welding wires have been developed which essentially comprise a powdered core portion with a casing or tubular portion enclosing the core material. As exemplified by U.S. Pat. Nos. 2,785,285; 3,418,446; 3,513,287 and 3,834,002 a variety of methods may be utilized to form a composite welding wire. For example, as more particularly disclosed in U.S. Pat. No. 3,418,446, a welding wire may be made by folding an elongated strip of flat metal into a channel shape with a powdered core material added thereto. Subsequently, the strip is folded and formed to encompass the core material with a lap or butt joint being formed between the edges of the strip. Once the strip has been formed, the electrode is drawn to achieve the desired diameter. Problems associated with the formation of composite welding wires, such as the localized collapse of the casing due to irregular compaction of the core material, reaction of the core material with impurities and atmospheric elements and work hardening of the casing material, have been corrected by uniformly compacting the core material and annealing the casing during the forming operations.

SUMMARY OF THE INVENTION

Thus, by utilizing a composite welding wire, the nature and composition of the particular constituents of the core can be selected and varied so that the welding wire is efficiently "matched" with the particular base metal or alloy that is to be welded. The composite, cored welding wire structure also permits various reactive metals and/or low melting point materials to be effectively enclosed by the casing so that deleterious reactions therewith and excessive loss of material during the welding process is reduced. The present invention particularly relates to a high strength, high toughness titanium alloy welding wire wherein the powdered alloying materials of aluminum, molybdenum, niobium, tantalum and vanadium constitute a compacted core portion that is enclosed by a titanium sheath. The core portion may be formed of powdered metals of the individual elements which are mixed together or from "master" powders which are machined from bars alloyed from the desired elements. In achieving the high strength, high toughness formulations, the range of titanium, by weight, is from about 75% to about 97%, the range of aluminum is from about 2% to about 10% and other alloying elements of molybdenum, niobium, tantalum and vanadium comprises the balance of the welding wire.

Accordingly, it is an object of this invention to provide a novel, composite welding wire useful for welding titanium alloys.

Another object of this invention is to provide a welding wire having a compacted powder core of alloying materials which is enclosed by a titanium sheath.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may be best understood by reference to the following description taken in connection with the accompanying drawings in which:

DESCRIPTION OF THE PREFERRED EMBODIMENT

Figure 1:
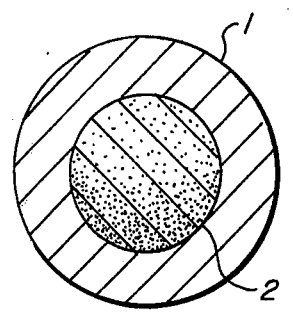
FIG. 1 is a cross-sectional view of a composite welding wire.

Referring to the drawings, the composite welding wire includes a tubular sheath portion 1 and a center or core portion 2 enclosed by the sheath. It will be understood that both the core 2 and casing 1 portions have an essentially uniform density along the entire length of the composite wire.

The composite welding wire may be made by utilizing a seamless tubular casing which is mounted on a large vibrating table and using premixed core materials which are placed in a hopper above the vibrating table. The desired core material is prepared by mixing finely ground powders of aluminum, molybdenum, niobium, tantalum and vanadium in the desired proportion. Subsequently, as the finely powdered core material is funneled into the lower end of the tubular casing, the table is vibrated to move the core materials through the casing and compact them. When the core materials pour from the opposite end of the tube, the tube is completely filled and the core materials are sufficiently compacted. To prevent deleterious reactions and interstitial contamination of the powdered materials and the titanium tubing with nitrogen, oxygen, hydrogen and carbon, such operations are normally carried out in an inert atmosphere (eg. argon).

The welding wire is then drawn, swaged or rolled down to an appropriate diameter for conventional welding processes. For example, with a tubing having a 0.220 inch outside diameter, it was necessary to perform five swaging steps to draw the wire down to a 0.125 inch outside diameter. Since titanium undergoes appreciable work hardening, it is often necessary to anneal the welding wire between the forming operations.

Another method for manufacturing the tubular welding wire begins with the sheathing material in the form of a thin strip of metal. The titanium strip is fed through a set of rollers and forming means that form and shape it into a channel having a U-shaped cross-section. Then, a premeasured charge of pre-mixed core material is fed into the channel whereupon the strip is fed through a second series of rolls which fold the sides of the channel over each other to enclose the core materials. Further rolling reduces the diameter of the formed wire to compact the coring materials and help prevent displacement of the core materials in the rolled sheath. The rolled sheath is then drawn or further rolled down to a smaller diameter to further compact the core material and make it compatible with conventional welding systems. Other means and arrangements for forming welding wires are generally disclosed in U.S. Pat. Nos. 2,785,285; 3,418,446; 3,513,287 and 3,834,002.

Alloy-cored titanium welding wires formed according to the foregoing methods can be used in a variety of welding processes such as manual gas-tungsten arc welding; automatic gas-tungstern-arc welding; semi-automatic gas-metal-arc welding; automatic gas-metal-arc welding and submerged arc welding.

Given hereinbelow are particular embodiments of the present invention wherein the core portion essentially comprises alloying materials and the casing or sheath portion essentially consists of titanium.

EXAMPLE I

Figure 2:
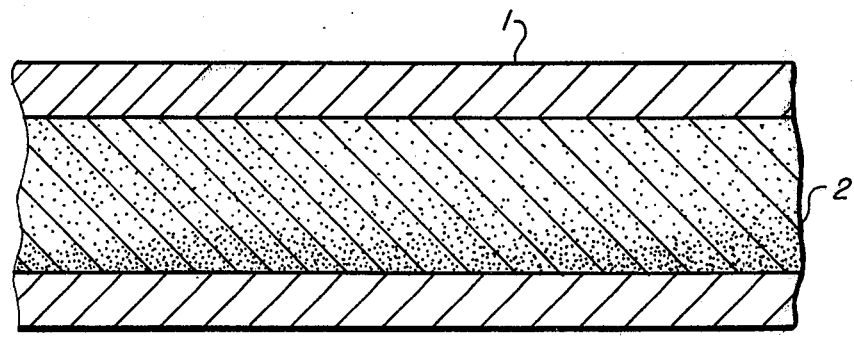
FIG. 2 is a longitudinal sectional view of a composite welding wire.

A composite titanium alloy welding wire, such as shown in FIGS. 1 and 2, was formed of materials having the following composition ranges:

| Element | Composition Range (By Weight Percent) |
|---|---|
| Titanium | 81–96 |
| Aluminum | 2–10 |
| Niobium | 1–4 |
| Tantalum | 0.5–3 |
| Molybdenum | 0.5–2 |

Depending upon the particular means employed and the method of deposition, the weld deposit should have the following range, by weight percent, of constituents:

| Element | Composition Range |
|---|---|
| Titanium | Balance |
| Aluminum | 5.5–6.5 |
| Niobium | 1.5–2.5 |
| Tantalum | 0.5–1.5 |
| Molybdenum | 0.5–1.0 |

The weld formed thereby should have the following nominal properties: a tensile strength of about 120 ksi., a 2% offset yield strength of 105 ksi., an elongation in four diameters of 10%, and a reduction in area of 25%. The Charpy V-notch toughness at 32° F. should exceed 35 ft.-lbs.

It should be noted that for a welding wire having a design proportion of, for example, about 93% or 96% titanium, it may be difficult to prepare a welding wire with the core portion comprising only about 3% or 6% of the wire. Accordingly, powdered titanium may be mixed with the powdered alloying materials such that, for a titanium constituency of about 95%, the titanium tubular portion may comprise about 80% of the weld wire and the core portion may include titanium powders to about 20% thereof.

EXAMPLE II

A second weld wire was designed having the following composition range, by weight percent:

| Element | Composition Range |
|---|---|
| Titanium | 83–96.5 |
| Aluminum | 2–10 |
| Niobium | 1–4 |
| Tantalum | 0.5–3 |

Weld deposits formed with this welding wire will have the following composition ranges, by weight percent:

| Element | Composition Range |
|---|---|
| Titanium | Balance |
| Aluminum | 2.5–3.5 |
| Niobium | 1.5–2.5 |
| Tantalum | 0.5–1.5 |

The welds formed with the welding wire will have the following nominal properties: a tensile strength of about 84 Ksi., a 2% offset yield strength of 75 ksi., an elongation in four diameters of 20%, and a reduction in area of 40%. The Charpy V-notch toughness at 32° F. should exceed 35 ft.-lb.

EXAMPLE III

A third composite, titanium alloy welding wire was designed to have a composition range, by weight percent, as follows:

| Element | Composition Range |
|---|---|
| Titanium | 75–97 |
| Aluminum | 2–10 |
| Vanadium | 1–15 |

Two examples of weld wire deposits which can be prepared according to the above mentioned composition range are designated as Weld A and Weld B below. In Weld A, the composition range of the weld deposit is as follows:

| Element | Composition Range (Weld A) |
|---|---|
| Titanium | Balance |
| Aluminum | 5.5–6.75 |
| Vanadium | 3.5–4.5 |

Weld A should have the following nominal properties: a tensile strength of 120 ksi., a 2% offset yield strength of 110 ksi., an elongation in four diameters of 10% and a reduction in area of 20%. The Charpy V-notch toughness at 32° F. should exceed 15–20 ft.-lb.

In Weld B, the composition range of the weld deposit is as follows:

| Element | Composition Range (Weld B) |
|---|---|
| Titanium | Balance |
| Aluminum | 2.5–3.5 |
| Vanadium | 2–3 |

Weld B should have the following nominal properties: a tensile strength of 93 ksi., a 2% offset yield strength of 82 ksi., an elongation in four diameters of 20%, and a reduction in area of 30%. The Charpy V-notch toughness at 32° F. should exceed 40–50 ft.-lb.

The welding wire of Examples I and II is particularly suited for welding near-alpha titanium alloys and the welding wire of Example III is particularly suited for welding alphabeta titanium alloys.

Obviously many modifications and variations of the present invention are possible in light of the above teachings. It is therefore to be understood that within the scope of the appended claims, the invention may be practiced otherwise than as specifically described.

What is claimed is:

1. A welding wire comprising a hollow tubular portion of titanium metal and a core portion filling said tubular portion; said core portion being formed of material selected from the group of aluminum, molybdenum, niobium, tantalum and vanadium; and said welding wire consists, by weight percent, essentially of from about 81% to about 96% titanium; from about 2% to about 10% aluminum; from about 1% to about 4% niobium; from about 0.5% to about 3% tantalum; and from about 0.5% to about 2% molybdenum.

2. A welding wire comprising a hollow tubular portion of titanium metal and a core portion filling said tubular portion; said core portion being formed of material selected from the group of aluminum, molybdenum, noibium, tantalum and vanadium; and said welding wire consists, by weight percent, essentially of from about 83% to about 96.5% titanium; from about 2% to about 10% alumanum; from about 1% to about 4% niobium; and from about 0.5% to about 3% tantalum.

3. A welding wire comprises a hollow tubular portion of titanium metal and a core portion filling said tubular portion, said core portion being formed of compacted powders selected from the group of aluminum, molybdenum, niobium, tantalum, and titanium; and said welding wire consists, by weight percent, essentially of from about 81% to about 96% titanium, from about 2% to about 10% aluminum, from about 1% to about 4% niobium, from about 0.5% to about 3% tantalum, and from about 0.5% to about 2% molybdenum.

4. The welding wire according to claim 3, wherein a weld deposit produced by using the weld wire in a deposition process selected from the group of manual gas-tungsten-arc welding, automatic gas-tungsten-arc welding, semi-automatic gas-metal-arc welding, automatic gas-metal-arc welding, and submerged arc welding consists essentially, by weight percent, of from about 5.5% to about 6.5% aluminum, from about 1.5% to about 2.5% niobium, from about 0.5% to about 1.5% tantalum, from about 0.5% to about 1.0% molybdenum, and a balance of titanium.

5. A welding wire comprises a hollow tubular portion of titanium metal and a core portion filling said tubular portion, said core portion being formed of compacted powders selected from the group of aluminum, niobium, tantalum, and titanium, and said welding wire consists, by weight percent, essentially of from about 83% to about 96.5% titanium, from about 2% to about 10% aluminum, from about 1% to about 4% niobium, and from about 0.5% to about 3% tantalum.

6. The welding wire according to claim 5, wherein a weld deposit produced by using the weld wire in a deposition process selected from the group of manual gas-tungsten-arc welding, automatic gas-tungsten-arc welding, semi-automatic gas-metal-arc welding, automatic gas-metal-arc welding, and submerged arc welding consists essentially of from about 2.5% to about 3.5% aluminum, from about 1.5% to about 2.5% niobium, from about 0.5% to about 1.5% tantalum, and a balance of titanium.

7. A welding wire comprising a hollow tubular portion of titanium metal and a core portion filling said tubular portion, said core portion being formed of compacted powders selected from the group of aluminum, titanium and vanadium, and said welding wire consists, by weight percent, essentially of from about 75% to about 97% titanium; from about 2% to about 10% aluminum; and from about 1% to about 15% vanadium.

8. A weld deposit on a titanium alloy plate material consists essentially, by weight percent, of from about 5.5% to about 6.5% aluminum, from about 1.5% to about 2.5% niobium, from about 0.5% to about 1.5% tantalum, from about 0.5% to about 1.0% molybdenum, and a balance of titanium; said weld deposit being produced by using a welding process selected from the group of manual gas-tungsten-arc welding, automatic gas-tungsten-arc welding, semi-automatic gas-metal-arc welding, automatic gas-metal-arc welding, and submerged arc welding; and said weld deposit being produced from a weld wire consisting essentially, by weight percent, of from about 81% to about 96% titanium, from about 2% to about 10% aluminum, from about 1% to about 4% niobium, from about 0.5% to about 3% tantalum, and from about 0.5% to about 2% molybdenum.

9. A weld deposit on a titanium alloy plate material consists essentially, by weight percent, of from about 2.5% to about 3.5% aluminum, from about 1.5% to about 2.5% niobium, from about 0.5% to about 1.5% tantalum, and a balance of titanium; said weld deposit being produced by using a welding process selected from the group of manual gas-tungsten-arc welding, automatic gas-tungsten-arc welding, semiautomatic gas-metal-arc welding, automatic gas-metal-arc welding, and submerged arc welding; and said weld deposit being produced from a weld wire consisting essentially, by weight percent, of from about 83% to about 96.5% titanium, from about 2% to about 10% aluminum, from about 1% to about 4% niobium, and from about 0.5% to about 3% tantalum.

* * * * *